United States Patent [19]

Watanabe et al.

[11] 4,292,081

[45] Sep. 29, 1981

[54] BORIDE-BASED REFRACTORY BODIES

[75] Inventors: Tadahiko Watanabe, Saga; Shinichi Kono, Ikoma, both of Japan

[73] Assignee: Director-General of the Agency of Industrial Science and Technology, Tokyo, Japan

[21] Appl. No.: 127,434

[22] Filed: Mar. 5, 1980

[30] Foreign Application Priority Data

Jun. 7, 1979 [JP] Japan .............................. 54-72779
Aug. 23, 1979 [JP] Japan .............................. 54-99220

[51] Int. Cl.³ .......................................... C04B 35/58
[52] U.S. Cl. ................................. 501/96; 501/102; 501/126; 501/132; 501/152
[58] Field of Search ................. 106/55, 57, 65, 66, 106/73.2

[56] References Cited

U.S. PATENT DOCUMENTS

| | | | |
|---|---|---|---|
| 2,802,748 | 8/1957 | Glaser | 106/55 |
| 3,215,545 | 11/1965 | Reidl et al. | 106/55 |
| 4,029,000 | 6/1977 | Nakamura et al. | 106/57 |

*Primary Examiner*—James Poer
*Attorney, Agent, or Firm*—Brisebois & Kruger

[57] ABSTRACT

The invention provides a novel class of sintered refractory and abrasive bodies composed mainly of one or a combination of metal diborides such as titanium diboride $TiB_2$, chromium diboride $CrB_2$, tantalum diboride $TaB_2$ and the like admixed with a minor amount of one or more kinds of metal borides exemplified by $MnB$, $Mn_3B_4$, $Mn_2B$, $Mn_4B$, $TiB$, $Ti_2B_5$, $Ti_2B$, $W_2B_5$ and $Mo_2B_5$. The sintered body can be prepared by conventional powder metallurgical processes such as hot pressing or sintering of a green body shaped in advance by molding in cold with the powder blend of the above described components. Further advantages are obtained by admixing the powder blend with small amounts of one or more of binder ingredients of relatively low melting points such as cobalt borides, iron borides, nickel borides and an alloy of nickel and phosphorus. So-called infusion process is also applicable for the preparation of the inventive sintered body.

6 Claims, No Drawings

BORIDE-BASED REFRACTORY BODIES

BACKGROUND OF THE INVENTION

The present invention relates to a novel class of boride-based refractory and abrasive bodies or, more particularly, to a class of refractory and abrasive bodies based on certain metal diborides as sintered with high density and high mechanical strengths even at elevated temperatures and also to a method for preparing the same.

With their extremely high melting points and hardness as well as excellent mechanical strengths at elevated temperatures, metal diborides such as titanium diboride are the most promising materials for construction of rockets, cutting tools, parts of thermal engines and the like. When metal diborides are to be sintered for use in these applications, however, difficulties are encountered because the sintering temperature is extremely high and the sintered bodies obtained are sometimes poor in the bending strengths and relatively brittle regardless of whether the metal borides are used either singly or as a combination of two kinds or more.

One of the inventors conducted extensive investigations to solve the above problems in the sintered refractory bodies of metal diborides and discovered that titanium diboride or other metal diborides could give improved sintered bodies when admixed with an alloy of nickel and phosphorus (see, for example, Japanese Patent Disclosure 52-106306).

These titanium diboride-based sintered bodies as developed above possess a bending strength reaching 100 to 150 kg/mm$^2$ but, needless to say, even higher bending strengths are sometimes required in the practical use of these kinds of refractory materials. In addition, the heat resistance of the above developed titanium diborite-based refractory materials is not always satisfactory due to the use of a nickel-phosphorus alloy with a relatively low melting point down to 890° C.

Accordingly, further investigations have been undertaken resulting in a discovery that admixture of nickel borides, iron borides and/or cobalt borides as a binder ingredient with a combination of at least two kinds of metal diborides instead of the nickel-phosphorus alloy can give much improved sintered refractory bodies (see, for example, Japanese Patent Application 54-36398 corresponding to a copending U.S. application Ser. No. 89,487).

The present invention has resulted from the works as an extension of the above investigations with the object to obtain metal diboride-based sintered refractory bodies with further improved or more reproducible mechanical properties, especially, at elevated temperatures.

SUMMARY OF THE INVENTION

Thus it is an object of the present invention to provide a novel sintered refractory body comprising a metal diboride as an essential ingredient and having excellent mechanical properties not only at room temperature but also at elevated temperatures required for high-performance refractory and abrasive materials as used in rocket construction, cutting tools, parts of thermal engines and the like.

The sintered refractory body of the present invention comprises the components of (a) at least one metal diboride selected from the group consisting of $TiB_2$, $CrB_2$, $TaB_2$, $MnB_2$, $MoB_2$, $YB_2$, $VB_2$, $HfB_2$, $NbB_2$, $AlB_2$ and $ZrB_2$, and (b) at least one metal boride selected from the group consisting of $MnB$, $Mn_3B_4$, $Mn_2B$, $Mn_4B$, $TiB$, $Ti_2B_5$, $Ti_2B$, $W_2B_5$ and $Mo_2B_5$.

The amount of the metal boride or borides as the component (b) in the sintered body is preferably in the range from 0.01 to 40% by weight, the balance being substantially the metal diboride or diborides as the component (a).

A further improvement in the mechanical properties of the sintered bodies is obtained by admixing a third component (c) as a binder ingredient which is selected from the group consisting of $NiB$, $Ni_4B_3$, $Ni_2B$, $Ni_3B$, $FeB$, $Fe_2B$, $CoB$, $Co_2B$, $Co_3B$ and an alloy of nickel and phosphorus composed of 3 to 25% by weight of phosphorus and 97 to 75% by weight of nickel.

In this ternary formulation of the components (a), (b) and (c), the weight proportion of the components is preferably such that the sintered body comprises from 0.01 to 40% by weight of the metal boride or borides as the component (b) and from 0.001 to 30% by weight of the binder ingredient or ingredients as the component (c), the balance being substantially the component (a).

The sintered refractory body of the present invention can be prepared by subjecting a powdery mixture of the components to sintering either by the techniques of hot-pressing or by heating a green body shaped in advance with the powdery mixture. Alternatively, the components (b) and/or (c) can be incorporated into a sintered body of the other components by the techniques of so-called infusion.

It should be noted that the components (b) and/or (c) in the above preparation can be replaced with other ingredients capable of ultimately forming the desired components (b) and/or (c) in the course of sintering.

DETAILED DESCRIPTION OF THE PREFERRED EMBODIMENTS

As is described above, the component (a) of the inventive sintered refractory body is one or a combination of two kinds or more of metal diborides selected from the group consisting of the diborides of titanium, chromium, tantalum, manganese, molybdenum, yttrium, vanadium, hafnium, niobium, aluminum and zirconium. It is preferable that the component (a) is a combination of at least two kinds of the metal diborides selected from the above named ones. In this combined use of the metal diborides, neither one of the metal diborides should be contained in the sintered body in an amount smaller than 1% by weight in order that the beneficial effect of the combined use can be fully exhibited.

The second component (b) of the inventive sintered refractory body is a metal boride or a combination of metal borides selected from the group consisting of borides of manganese, e.g. $MnB$, $Mn_3B_4$, $Mn_2B$ and $Mn_4B$, borides of titanium, e.g. $TiB$, $Ti_2B_5$ and $Ti_2B$, borides of tungsten, e.g. $W_2B_5$, and borides of molybdenum, e.g. $Mo_2B_5$, these metal borides including no metal diborides.

The amount of the component (b) in the sintered body essentially composed of the components (a) and (b) is preferably in the range from 0.01 to 40% by weight or, more preferably, from 0.05 to 40% by weight, the balance being substantially the component (a). When the amount of the component (b) is smaller than above, the resultant sintered body has no satisfactory mechanical strengths while an excessive amount of the component (b) leads to a decreased heat resistance of the sintered body prepared therewith.

The sintered body of the invention composed of the above described components (a) and (b) is prepared by the well-established powder metallurgical techniques. Thus, finely pulverized powders, preferably, having a particle diameter of about 5 μm or smaller, of the components are intimately blended to form a powder mixture which is subjected to hot-pressing in a mold of, for example, graphite in vacuum or in an inert or reducing atmosphere of argon or hydrogen gas. The compressive pressure in the hot-pressing is desirably 50 kg/cm$^2$ or higher and the temperature is 1000° C. or higher or, more preferably, 1400° C. or higher. This sintering procedure by hot-pressing under the above conditions takes about 10 minutes or longer.

Alternatively, the powder mixture of the components (a) and (b) is first shaped by compression in cold into a so-called green body which is then subjected to sintering by heating in vacuum or in an inert or reducing atmosphere of argon or hydrogen gas. The temperature in this green-body sintering is about the same as in the hot-pressing but it takes somewhat longer time of, usually, 30 minutes or longer.

Further alternatively, the technique of so-called infusion is applicable in this case. Thus, the component (a), i.e. the metal diboride or diborides, is first shaped by compression molding into a shaped body which is dipped in a melt of the component (b) to effect soaking of the latter component in the porosity of the shaped body with simultaneous sintering. This procedure of infusion is, however, not without a disadvantage because the metal boride has a considerably high melting point than the sintering temperature in hot pressing or green-body sintering. For example, the infusion of molten titanium boride TiB in a shaped body of a powder mixture of titanium diboride and tantalum diboride must be carried out at a temperature of 2300° C. or higher so as that the molten TiB has a sufficient fluidity to penetrate the shaped body.

Furthermore, it is optional to replace the component (b) with the other ingredient or ingredients capable of ultimately forming the desired component (b) in the course of sintering either by reacting with the component (a) or by the reaction of the ingredients per se. For example, titanium boride, e.g. TiB, can be replaced with a powder of metallic titanium or a combination of metallic titanium and elementary boron. The metallic titanium thus admixed with the component (a) supposedly reacts with the component (a) to be converted into the desired titanium boride, e.g. TiB, in the course of sintering or the metallic titanium reacts with the elementary boron admixed together with it to form the titanium boride, e.g. TiB.

The above mentioned technique of substitution of equivalent ingredients for the component (b) is also applicable to the infusion procedure. For example, a mixed melt of metallic titanium and manganese boride MnB is first prepared at 2200° C. and a shaped body of the metal diboride or diborides is dipped in the melt to effect the infusion of the mixed melt as the component (b). It is presumable that the metallic titanium in the above mixed melt first reacts with the manganese boride to be converted into a titanium boride with simultaneous formation of certain lower borides of manganese, e.g. Mn$_2$B and Mn$_4$B.

When further improvements are desired in the mechanical properties or in the sintering conditions of the sintered body prepared with the components (a) and (b) above, it is a recommendable way to further admix one or more of the binder ingredients as the component (c) selected from the group consisting of nickel borides, e.g. NiB, Ni$_4$B$_3$, Ni$_2$B and Ni$_3$B, iron borides, e.g. FeB and Fe$_2$B, cobalt borides, e.g. CoB, Co$_2$B and Co$_3$B, and alloys of nickel and phosphorus composed of 3 to 25% by weight of phosphorus and 97 to 75% by weight of nickel. The amount of this component (c) in the sintered body of the invention should not exceed 30% by weight or, preferably, 20% by weight since an excessively large amount of it results in a markedly decreased heat resistance of the sintered body due to the relatively low melting point of the component (c). This is especially the case with the nickel-phosphorus alloys. On the other hand, no substantial beneficial effects can be expected by the admixture of this component (c) when the amount of the component (c) in the sintered body is smaller than 0.001% by weight or, more particularly, 0.05% by weight.

It is of course that the component (c), i.e. the borides of nickel, iron and cobalt and the nickel-phosphorus alloys, may be replaced with other ingredient or ingredients capable of forming the desired boride or alloy in the course of the sintering. For example, the boride of nickel, iron or cobalt may be replaced with a combination of the elementary boron and the respective metal and the nickel-phosphorus alloy may be replaced with equivalent amounts of metallic nickel and elementary phosphorus. The technique of infusion is also applicable to this component (c) by use of a melt of the component (c) alone or a mixed melt of the components (b) and (c). The disadvantage of a high infusion temperature as in the infusion of the component (b) is not involved in this case since the borides and alloys as the component (c) all have a relatively low melting temperature comparable with the sintering temperature.

It has been additionally noted that, instead of the formulations of the components (a) and (b) or components (a), (b) and (c) above described, even the omission of the component (a) can lead to considerably good results when the component (b) is W$_2$B$_5$ and/or Mo$_2$B$_5$ specifically selected from the above named metal borides as combined with the component (c), the content of the component (c) in the sintered body being in the range from 0.01 to 50% by weight or, preferably, from 0.05 to 20% by weight with the balance being W$_2$B$_5$ and/or Mo$_2$B$_5$. The processing conditions in this formulation of the components (b) and (c) are substantially the same as in the formulations of the components (a) and (b) or components (a), (b) and (c) described above.

Following are the examples to illustrate the present invention in further detail, in which % and parts are all given by % by weight and parts by weight, respectively.

EXAMPLE 1.

(Experiments No. 1 to No. 3)

Three kinds of powder blends were prepared with titanium diboride as the base ingredient. The respective formulations are given in Table 1. A graphite mold was filled with one of the well mixed powder blends and sintering of the powder blend was carried out by hot pressing in vacuum at 1800° C. under a pressure of 200 kg/cm$^2$ for 30 minutes in Experiments No. 1 and No. 2 and or 15 minutes in No. 3.

Each of the thus obtained sintered bodies had a relative density of 100% and the results of the measurements of bending strength at room temperature and the Vickers hardness at room temperature or at 1000° C. undertaken with the sintered bodies are set out in Table 1.

TABLE 1

| Exp. No. | Diboride (parts) | Boride (parts) | Binder (parts) | Bending strength, kg/mm$^2$ | Vickers hardness, kg/mm$^2$ room temp. | Vickers hardness, kg/mm$^2$ 1000° C. |
|---|---|---|---|---|---|---|
| 1 | TiB$_2$ (100) TaB$_2$ (5) | MnB (1) | — | 200 | 3300 | 2500 |
| 2 | TiB$_2$ (100) TaB$_2$ (5) | TiB (3) | — | 200 | 3300 | 2650 |
| 3 | TiB$_2$ (100) | W$_2$B$_5$ (5) | NiB (1) | 220 | 3200 | 2300 |

EXAMPLE 2.

(Experiments No. 4 to No. 14)

Powder blends were prepared each by uniformly mixing 90 parts of a metal diboride indicated in Table 2 and 10 parts of manganese boride MnB and sintering of the powder blend was carried out by hot pressing in a graphite mold under a pressure of 200 kg/cm$^2$ for compression at 1600° C. for 30 minutes in vacuum (Experiments No. 4 to No. 10 and No. 14) or in an atmosphere of argon gas (Experiment No. 11) or hydrogen gas (Experiments No. 12 and No. 13) except for Experiment No. 8 in which a green body was first shaped by molding in cold and the green body was sintered in vacuum at 1700° C. for 60 minutes.

The sintered bodies obtained in all of the experiments other than No. 12 and No. 13 had a relative density of 100% while the relative density of the bodies obtained in Experiments No. 12 and No. 13 was 99.8%. Table 2 summarizes the results of the measurements of bending strength at room temperature and the Vickers hardness at room temperature or at 1000° C. undertaken with these sintered bodies.

TABLE 2

| Exp. No. | Diboride | Bending strength, kg/mm$^2$ | Vickers hardness, kg/mm$^2$ room temp. | Vickers hardness, kg/mm$^2$ 1000° C. |
|---|---|---|---|---|
| 4 | TiB$_2$ | 130 | 2000 | 900 |
| 5 | TaB$_2$ | 120 | 1900 | 850 |
| 6 | VB$_2$ | 115 | 1850 | 850 |
| 7 | NbB$_2$ | 120 | 1950 | 900 |
| 8* | MnB$_2$ | 100 | 1850 | 900 |
| 9 | MoB$_2$ | 130 | 1900 | 850 |
| 10 | YB$_2$ | 110 | 1850 | 800 |
| 11 | HfB$_2$ | 120 | 1850 | 780 |
| 12 | AlB$_2$ | 100 | 1700 | 750 |
| 13 | ZrB$_2$ | 100 | 1800 | 800 |
| 14 | CrB$_2$ | 120 | 1850 | 900 |

*green-body sintering

EXAMPLE 3.

(Experiments No. 15 to No. 20)

Powder blends were prepared each by uniformly mixing one of the metal diborides indicated in Table 3 with 5% of manganese boride MnB and one or more of the binder ingredients as indicated in Table 3 in amounts also given in the table, the balance being the metal diboride. The nickel-phosphorus alloy used as a binder was composed of 92% of nickel and 8% of phosphorus.

Sintering of the powder blend was carried out in the same manner as in Example 2 by hot pressing at a temperature of 1400° to 1600° C. in vacuum under a pressure of 200 kg/cm$^2$ for compression except for Experiment No. 18 in which a green body shaped in advance in cold was subjected to sintering without pressure at 1800° C. for 60 minutes in vacuum.

The relative density of the sintered bodies was 100% in all of the experiments. The bending strength and Vickers hardness determined with these sintered bodies are set out in Table 3.

TABLE 3

| Exp. No. | Diboride | Binder (%) | Sintering temp., °C. | Bending strength, kg/mm$^2$ | Vickers hardness, kg/mm$^2$ room temp. | Vickers hardness, kg/mm$^2$ 1000° C. |
|---|---|---|---|---|---|---|
| 15 | TiB$_2$ | CoB (5) | 1600 | 130 | 1950 | 850 |
| 16 | TaB$_2$ | NiB (5) | 1600 | 115 | 1800 | 800 |
| 17 | VB$_2$ | Ni$_4$B$_3$ (5) | 1600 | 115 | 1800 | 800 |
| 18* | NbB$_2$ | FeB (5) | 1800 | 110 | 1900 | 800 |
| 19 | MnB$_2$ | Ni-P (5) | 1500 | 120 | 1800 | 850 |
| 20 | CrB$_2$ | CoB (1) NiB (1) FeB (1) Ni-P (1) | 1400 | 120 | 1800 | 800 |

*green-body sintering

EXAMPLE 4.

(Experiments No. 21 to No. 33)

Powder blends were prepared each by uniformly mixing two kinds or more of metal diborides with manganese boride MnB or equivalent amounts of metallic manganese and boron. The formulations are shown in Table 4.

Sintering of these powder blends was carried out in the same manner as in Example 2 by hot pressing at a temperature of 1700° to 1800° C. under a pressure of 200 kg/cm$^2$ for compression in an atmosphere of argon gas in Experiment No. 29 or in vacuum in all of the other experiments except for Experiment No. 21 in which a green body shaped in advance in cold was subjected to sintering without pressure at 2000° C. for 60 minutes in vacuum.

All of the thus obtained sintered bodies had a relative density of 100% except for Experiment No. 29 in which the value was 99.8%. The results of the measurements of bending strength and Vickers hardness undertaken with these sintered bodies are set out in Table 4.

TABLE 4

| Exp. No. | Diborides (%) | | MnB or equivalents, % | Sintering temp., °C. | Bending strength, kg/mm² | Vickers hardness, kg/mm² | |
|---|---|---|---|---|---|---|---|
| | | | | | | room temp. | 1000° C. |
| 21* | TiB₂ | (94) | | | | | |
| | TaB₂ | (5) | 1 | 2000 | 180 | 3100 | 2400 |
| 22 | TiB₂ | (94.9) | | | | | |
| | TaB₂ | (5) | 0.1 | 1800 | 190 | 3300 | 2500 |
| 23 | TiB₂ | (74) | | | | | |
| | TaB₂ | (25) | 1 | 1800 | 190 | 3200 | 2350 |
| 24 | TiB₂ | (94) | 0.84 (Mn) + | | | | |
| | NbB₂ | (5) | 0.16 (B) | 1750 | 200 | 3300 | 2300 |
| 25 | TiB₂ | (94) | | | | | |
| | VB₂ | (5) | 1 | 1700 | 200 | 3300 | 2350 |
| 26 | TiB₂ | (97) | | | | | |
| | CrB₂ | (2) | 1 | 1800 | 190 | 3300 | 2350 |
| 27 | TiB₂ | (96) | | | | | |
| | MnB₂ | (3) | 1 | 1800 | 185 | 3300 | 2300 |
| 28 | TiB₂ | (94) | | | | | |
| | HfB₂ | (5) | 1 | 1800 | 185 | 3400 | 2350 |
| 29 | TiB₂ | (94) | | | | | |
| | MoB₂ | (5) | 1 | 1800 | 170 | 3200 | 2300 |
| 30 | TiB₂ | (94) | | | | | |
| | MoB₂ | (5) | 1 | 1800 | 185 | 3200 | 2400 |
| 31 | HfB₂ | (94) | | | | | |
| | CrB₂ | (5) | 1 | 1700 | 190 | 3200 | 2350 |
| 32 | MnB₂ | (94) | | | | | |
| | TaB₂ | (5) | 1 | 1800 | 180 | 3000 | 2300 |
| 33 | TiB₂ | (95) | | | | | |
| | TaB₂ | (1) | | | | | |
| | VB₂ | (1) | 1 | 1800 | 200 | 3300 | 2500 |
| | NbB₂ | (1) | | | | | |
| | CrB₂ | (1) | | | | | |

*green-body sintering

EXAMPLE 5.

(Experiments No. 34 to No. 36)

Powder blends were prepared each by uniformly mixing two kinds or more of metal diborides with 0.5% of manganese boride MnB and one or more of the binder ingredients. The formulations are shown in Table 5, the balance being MnB. The nickel-phosphorus alloy used in Experiment No. 36 was the same alloy as in Example 3.

Sintering of these powder blends was carried out in the same manner as in Example 2 by hot pressing at 1800° C. (Experiments No. 34 and No. 35) or at 1700° C. (Experiment No. 36) under a pressure of 200 kg/cm² for compression in vacuum.

The thus obtained sintered bodies had a relative density of 100% in all of the experiments. The results of the measurements of bending strength and Vickers hardness undertaken with these sintered bodies are set out in the Table 5.

TABLE 5

| Exp. No. | Diborides (%) | | Binders (%) | | Bending strength, kg/mm² | Vickers hardness, kg/mm² | |
|---|---|---|---|---|---|---|---|
| | | | | | | room temp. | 1000° C. |
| 34 | TiB₂ | (94) | | | | | |
| | TaB₂ | (5) | CoB | (0.5) | 200 | 3300 | 2500 |
| 35 | TiB₂ | (93.2) | | | | | |
| | TaB₂ | (2) | FeB | (0.1) | | | |
| | VB₂ | (2) | NiB | (0.1) | 200 | 3300 | 2500 |
| | NbB₂ | (2) | CoB | (0.1) | | | |
| 36 | TiB₂ | (94.1) | | | | | |
| | TaB₂ | (2) | CoB | (0.1) | | | |
| | CrB₂ | (1) | FeB | (0.1) | 200 | 3300 | 2300 |
| | MoB₂ | (1) | Ni₄B₃ | (0.1) | | | |
| | HfB₂ | (1) | Ni-P | (0.1) | | | |

EXAMPLE 6.

(Experiments No. 37 to No. 50)

Powder blends were prepared each by uniformly mixing two kinds or more of the metal diborides with titanium boride TiB or equivalent ingredients, i.e. metallic titanium or a combination of metallic titanium and boron. The formulations are shown in Table 6.

Sintering of these powder blends was carried out in the same manner as in Example 2 by hot pressing in vacuum under a pressure of 200 kg/cm² for compression at 2100° C. in Experiment No. 45 or at 1800° C. in all of the other experiments except for Experiments No. 37 and No. 42. The sintering in Experiment No. 37 was carried out at 2400° C. without pressure in an atmosphere of argon gas with a green body shaped in advance by molding in cold. In Experiment No. 42, a sintered body shaped in advance with the metal diborides was subjected to infusion in a molten bath of titanium boride TiB at 2400° C. in an atmosphere of argon gas. The amount of molten titanium boride taken up by the sintered body was calculated from the densities of the sintered body before and after infusion as well as the density of the infused component.

The relative density of the sintered bodies thus obtained was 100% in all of the experiments. The results of the measurements of bending strength and Vickers hardness undertaken with these sintered bodies are set out in Table 6.

TABLE 6

| Exp. No. | Diborides (%) | | TiB or equivalents, % | Bending strength, kg/mm² | Vickers hardness, kg/mm² | |
|---|---|---|---|---|---|---|
| | | | | | room temp. | 1000° C. |
| 37* | TiB₂ | (94) | | | | |

TABLE 6-continued

| Exp. No. | Diborides (%) | | TiB or equivalents, % | Bending strength, kg/mm² | Vickers hardness, kg/mm² room temp. | Vickers hardness, kg/mm² 1000° C. |
|---|---|---|---|---|---|---|
| 38 | TaB₂ TiB₂ | (5) (75) | 1 | 190 | 3200 | 2550 |
| 39 | TaB₂ TiB₂ | (5) (74) | 20 | 200 | 3200 | 2500 |
| 40 | TaB₂ TiB₂ | (25) (92) | 1 | 180 | 3300 | 2600 |
| 41 | TaB₂ TiB₂ | (5) (91.3) | 3 (Ti) | 200 | 3300 | 2600 |
| 42** | TaB₂ TiB₂ | (5) (95) | 3 (Ti) + 0.7 (B) | 200 | 3300 | 2600 |
| 43 | TaB₂ TiB₂ | (5) (94) | (See text) | 200 | 3300 | 2600 |
| 44 | TiB₂ NbB₂ | (94) (3) | 3 | 200 | 3300 | 2600 |
| 45 | TiB₂ NbB₂ | (96) (3) | 3 (Ti) | 200 | 3300 | 2600 |
| 46 | TiB₂ VB₂ | (95) (3) | 1 | 195 | 3250 | 2550 |
| 47 | TiB₂ CrB₂ | (94) (2) | 3 (Ti) | 200 | 3300 | 2600 |
| 48 | TiB₂ MnB₂ | (92) (3) | 3 | 200 | 3300 | 2600 |
| 49 | TiB₂ MoB₂ | (92) (5) | 3 (Ti) | 185 | 3200 | 2550 |
| 50 | TiB₂ YB₂ TaB₂ VB₂ NbB₂ CrB₂ | (93) (1) (1) (1) (1) | 3 | 185 200 | 3200 3300 | 2600 2650 |

*green-body sintering
**infusion method

EXAMPLE 7.

(Experiments No. 51 to No. 55)

Powder blends were prepared each by uniformly mixing two kinds or more of the metal diborides with titanium boride TiB or metallic titanium with optional admixture of manganese boride MnB and one or more of the binder ingredients. The formulations are shown in Table 7. The nickel-phosphorus alloy used in Experiment No. 53 was the same alloy as used in Example 3.

Sintering of these powder blends was carried out in Experiments No. 51 to No. 53 by hot pressing in the same manner as in Example 2 at 1800° C. (No. 51 and No. 52) or at 1650° C. (No. 52) under a pressure of 200 kg/cm² for compression in vacuum. In Experiment No. 54, a green body shaped in advance by molding in cold was subjected to sintering at 2000° C. without pressure in vacuum for 60 minutes. In Experiment No. 55, a sintered body prepared in advance with the metal diborides was subjected to infusion in a molten bath of a mixture of metallic titanium and manganese boride MnB at 2200° C. in an atmosphere of hydrogen gas.

The relative density of the thus obtained sintered bodies was 100% in all of the experiments. The results of the measurements of bending strength and Vickers hardness undertaken with these sintered bodies are set out in Table 7.

TABLE 7

| Exp. No. | Di-borides (%) | Borides or equivalents (%) | Binders (%) | Bending strength, kg/mm² | Vickers hardness, kg/mm² room temp. | Vickers hardness, kg/mm² 1000° C. |
|---|---|---|---|---|---|---|
| 51 | TiB₂ (93.5) TaB₂ (5) | TiB (1) | CoB (0.5) | 200 | 3300 | 2550 |
| 52 | TiB₂ (92.4) TaB₂ (5) | Ti (2) | NiB (0.5) | 200 | 3300 | 2550 |
| 53 | TiB₂ (92.4) TaB₂ (2) VB₂ (2) NbB₂ (2) | TiB (1) MnB (0.1) | CoB (0.1) FeB (0.1) NiB (0.1) Ni₄B₃ (0.1) Ni-P (0.1) | 200 | 3200 | 2500 |
| 54* | TiB₂ (92.5) VB₂ (5) | Ti (2) | FeB (0.5) | 190 | 3200 | 2500 |
| 55** | TiB₂ (95) NbB₂ (5) | Ti + 3% MnB (see text) | | 200 | 3200 | 2600 |

*green-body sintering
**infusion method

EXAMPLE 8.

(Experiments No. 56 to No. 69)

Powder blends were prepared each by uniformly mixing a metal diboride indicated in Table 8 with titanium boride TiB or an equivalent, i.e. metallic titanium or a combination of metallic titanium and boron. The formulations are shown in Table 8.

Sintering of these powder blends was carried out by hot pressing in the same manner as in Example 2 under a pressure of 200 kg/cm² for compression in vacuum for 30 minutes at a temperature of 1700° C. or 1800° C. except for Experiments No. 63 and No. 64. The sintering in Experiment No. 63 was carried out by heating a green body shaped in advance by molding in cold at 2400° C. for 60 minutes in an atmosphere of argon gas without pressure for compression. Experiment No. 64 was carried out by the infusion process in which a sintered body of manganese diboride was immersed in a molten bath of titanium metal at 2200° C. in vacuum.

The relative density of the thus obtained sintered bodies was 100% in all of the experiments. The results of the measurements of bending strength and Vickers hardness undertaken with these sintered bodies are set out in Table 8.

TABLE 8

| Exp. No. | Diboride (%) | TiB or equivalents, (%) | Sintering temp., °C. | Bending strength, kg/mm² | Vickers hardness, kg/mm² room temp. | Vickers hardness, kg/mm² 1000° C. |
|---|---|---|---|---|---|---|
| 56 | TiB₂ (90) | TiB (10) | 1800 | 140 | 2100 | 1200 |
| 57 | TiB₂ (90) | Ti (10) | 1700 | 140 | 2000 | 1200 |
| 58 | TiB₂ (87.6) | Ti (10) B (2.4) | 1800 | 135 | 2000 | 1000 |
| 59 | TiB₂ (84.3) | TiB (10) B (5.7) | 1800 | 130 | 2000 | 1000 |
| 60 | TiB₂ (81.8) | TiB (10) B (8.2) | 1800 | 130 | 2000 | 1000 |
| 61 | TaB₂ (90) | TiB (10) | 1800 | 140 | 2100 | 1200 |
| 62 | VB₂ (90) | Ti (10) | 1700 | 140 | 2000 | 1200 |
| 63* | NbB₂ (90) | TiB (10) | 2400 | 130 | 2000 | 1100 |
| 64** | MnB₂ (90) | Ti (see text) | 2200 | 140 | 2100 | 1200 |
| 65 | MoB₂ (90) | TiB (10) | 1800 | 130 | 2000 | 1000 |
| 66 | YB₂ (90) | Ti (10) | 1700 | 130 | 2000 | 1100 |
| 67 | HfB₂ (90) | TiB (10) | 1800 | 140 | 2000 | 1100 |

TABLE 8-continued

| Exp. No. | Diboride (%) | TiB or equivalents, (%) | Sintering temp., °C. | Bending strength, kg/mm² | Vickers hardness, kg/mm² room temp. | 1000° C. |
|---|---|---|---|---|---|---|
| 68 | CrB₂ (90) | Ti (10) | 1700 | 130 | 1800 | 1000 |
| 69 | ZrB₂ (90) | TiB (10) | 1800 | 130 | 2100 | 1100 |

*green-body sintering
**infusion method

EXAMPLE 9.

(Experiments No. 70 to No. 74)

Powder blends were prepared each by uniformly mixing a titanium diboride $TiB_2$ with titanium boride TiB or metallic titanium, optionally, with admixture of manganese boride MnB and one or more of the binder ingredients. The formulations are shown in Table 9. The nickel-phosphorus alloy used in Experiment No. 72 was the same alloy as used in Example 3.

Sintering was carried out in Experiments No. 70 to No. 72 by hot pressing in the same manner as in Example 2 under a pressure of 200 kg/cm² for compression in vacuum for 30 minutes at 1700° C. (No. 70) or at 1600° C. (No. 71 and No. 72). Experiment No. 73 was carried out by the green body process with sintering at 1900° C. for 60 minutes in vacuum and Experiment No. 74 was carried out by the infusion process with a sintered body of titanium diboride immersed in a mixed molten bath of metallic titanium and manganese boride MnB at 2200° C. in an atmosphere of argon gas.

The relative density of the thus obtained sintered bodies was 100% in all of the experiments. The results of the measurements of bending strength and Vickers hardness undertaken with these sintered bodies are set out in Table 9.

TABLE 9

| Exp. No. | TiB₂ (%) | Borides or equivalents (%) | Binders (%) | Bending strength, kg/mm² | Vickers hardness, kg/mm² room temp. | 1000° C. |
|---|---|---|---|---|---|---|
| 70 | 96.5 | TiB (3) | CoB (0.5) | 140 | 2000 | 1150 |
| 71 | 94.5 | Ti (5) | NiB (0.5) | 140 | 1950 | 1100 |
| 72 | 96.4 | TiB (3) | CoB (0.1) Feb (0.1) | | | |
| 73* | 97.2 | Ti (2) | MnB (0.1) NiB (0.1) Ni₄B₃ (0.1) Ni-P (0.1) FeB (0.5) | 135 | 2100 | 1100 |
| 74** | TiB₂ — (Ti — 3% MnB) (see text) | | | 140 | 2000 | 1150 |

*green-body sintering
**infusion method

EXAMPLE 10.

(Experiments No. 75 to No. 88)

Powder blends were prepared each by uniformly mixing a metal diboride and one or two of the metal borides selected from MnB, $Mo_2B_5$ and $W_2B_5$ with or without addition of a binder ingredient. The formulations are shown in Table 10. The nickel-phosphorus alloy used in Experiment No. 84 was the same alloy as used in Example 3.

Sintering in Experiments No. 75 to No. 86 was carried out by hot pressing in the same manner as in Example 2, in which the pressure for compression and the sintering time were 200 kg/cm² and 15 minutes, respectively, in all experiments and the atmosphere was vacuum except for Experiment No. 78 where an atmosphere of hydrogen gas was used. The sintering temperature was 1780° C. in Experiments No. 75, No. 77 and No. 79 and 1800° C. in the other experiments. Experiment No. 87 was carried out by the green body process with sintering at 1900° C. for 60 minutes in vacuum. Experiment No. 88 was carried out by the infusion process in which a sintered body of $TiB_2$ and $W_2B_5$ was immersed in a molten bath of CoB at 1700° C. in vacuum.

The relative density of the thus obtained sintered bodies was 100% in all of the experiments. The results of the measurements of bending strength and Vickers hardness undertaken with these sintered bodies are set out in Table 10.

TABLE 10

| Exp. No. | Diboride (%) | | Borides (%) | | Binder (%) | | Bending strength, kg/mm² | Vickers hardness, kg/mm² room temp. | 1000° C. |
|---|---|---|---|---|---|---|---|---|---|
| 75 | TiB₂ | (96) | MnB Mo₂B₅ | (1) (3) | — | | 150 | 3200 | 2300 |
| 76 | TiB₂ | (96) | Mo₂B₅ | (3) | NiB | (1) | 170 | 3150 | 2200 |
| 77 | TiB₂ | (94) | Mo₂B₅ | (5) | CoB | (1) | 210 | 3200 | 2100 |
| 78 | TiB₂ | (94) | Mo₂B₅ | (5) | FeB | (1) | 170 | 3200 | 2100 |
| 79 | TiB₂ | (94) | MnB W₂B₅ | (1) (5) | — | | 160 | 3300 | 2350 |
| 80 | TiB₂ | (94) | W₂B₅ | (5) | NiB | (1) | 220 | 3100 | 2300 |
| 81 | TiB₂ | (90) | W₂B₅ | (5) | CoB | (5) | 200 | 3100 | 2250 |
| 82 | TiB₂ | (94) | W₂B₅ | (5) | FeB | (1) | 150 | 3100 | 2200 |
| 83 | TaB₂ | (5) | W₂B₅ | (94) | CoB | (1) | 220 | 2100 | 1200 |
| 84 | CrB₂ | (5) | W₂B₅ | (94) | Ni-P | (1) | 220 | 2000 | 1150 |
| 85 | VB₂ | (5) | W₂B₅ | (94) | NiB | (1) | 210 | 2000 | 1000 |
| 86 | NbB₂ | (5) | MnB Mo₂B₅ | (1) (94) | — | | 200 | 2100 | 1050 |
| 87* | TiB₂ | (94) | Mo₂B₅ | (5) | CoB | (1) | 180 | 3100 | 2000 |
| 88** | TiB₂ | (95) | W₂B₅ | (5) | CoB (see text) | | 200 | 3000 | 1900 |

*green-body sintering
**infusion method

EXAMPLE 11.

(Experiments No. 89 to No. 93)

Powder blends were prepared each by uniformly mixing 90% of $W_2B_5$ or $Mo_2B_5$ with 10% of TiB, Ti, CoB or NiB. The combinations of the components are shown in Table 11.

Sintering of these powder blends was carried out by hot pressing in the same manner as in Example 2 under a pressure for compression of 200 kg/cm$^2$ in vacuum for 15 minutes. The sintering temperature was 1800° C. in Experiments No. 89, No. 90 and No. 92 and 1600° C. in No. 91 and No. 93.

The relative density of these sintered bodies was 100% in all of the experiments. The results of the measurements of bending strength and Vickers hardness undertaken with these sintered bodies are set out in Table 11.

TABLE 11

| Exp. No. | Components | Bending strength, kg/mm$^2$ | Vickers hardness, kg/mm$^2$ | |
|---|---|---|---|---|
| | | | room temp. | 1000° C. |
| 89 | $W_2B_5$-TiB | 100 | 2300 | 1700 |
| 90 | $W_2B_5$-Ti | 120 | 2350 | 1800 |
| 91 | $W_2B_5$-CoB | 90 | 2000 | 900 |
| 92 | $Mo_2B_5$-TiB | 100 | 2200 | 1750 |
| 93 | $Mo_2B_5$-NiB | 110 | 2000 | 850 |

What is claimed is:

1. A sintered refractory body which comprises
   (a) from 99.99 to 60% by weight of at least one metal diboride selected from the group consisting of titanium diboride, chromium diboride, tantalum diboride, manganese diboride, molybdenum diboride, yttrium diboride, vanadium diboride, hafnium diboride, niobium diboride, aluminum diboride and zirconium diboride,
   (b) from 0.01 to 40% by weight of at least one metal boride selected from the group consisting of MnB, $Mn_3B_4$, $Mn_2B$, $Mn_4B$, TiB, $Ti_2B_5$, $Ti_2B$, $W_2B_5$ and $Mo_2B_5$, and
   (c) from 0.001 to 30% by weight of a binder ingredient selected from the group consisting of NiB, $Ni_4B_3$, $Ni_2B$, $Ni_3B$, FeB, $Fe_2B$, CoB, $Co_2B$, $Co_3B$ and an alloy of nickel and phosphorus composed of 3 to 25% by weight of phosphorus and 97 to 75% by weight of nickel.

2. The sintered refractory body as claimed in claim 1 wherein the component (a) is a combination of at least two metal diborides selected from the group consisting of the diborides of titanium, chromium, tantalum, manganese, molybdenum, yttrium, vanadium, hafnium, niobium, aluminum and zirconium, the amount of each of the metal diborides in the sintered refractory body being not smaller than 1% by weight.

3. A method for the preparation of a sintered ceramic body which comprises
   (a) mixing from 99.99 to 60% by weight of at least one metal diboride selected from the group consisting of titanium diboride, chromium diboride, tantalum diboride, manganese diboride, molybdenum diboride, yttrium diboride, vanadium diboride, hafnium diboride, niobium diboride, aluminum diboride and zirconium diboride and from 0.01 to 40% by weight of at least one metal boride selected from the group consisting of MnB, $Mn_2B$, $Mn_4B$, TiB, $Ti_2B_5$, $Ti_2B$, $W_2B_5$ and $Mo_2B_5$ with from 0.001 to 30% by weight of a binder ingredient selected from the group consisting of NiB, $Ni_4B_3$, $Ni_2B$, $Ni_3B$, FeB, $Fe_2B$, CoB, $Co_2B$, $Co_3B$ and an alloy of nickel and phosphorus composed of 3 to 25% by weight of phosphorus and 97 to 75% by weight of nickel to form a powder blend, and
   (b) subjecting the powder blend to sintering by heating into a sintered body.

4. The method as claimed in claim 3 wherein the step of sintering by heating is carried out with the powder blend simultaneously under pressure for compression.

5. The method as claimed in claim 3 wherein the step of sintering by heating is carried out with the powder blend shaped in advance by molding in cold.

6. The method as claimed in claim 3 wherein the metal boride is replaced with the metal corresponding to the metal boride or a combination of the metal corresponding to the metal boride and elementary boron.

* * * * *

UNITED STATES PATENT AND TRADEMARK OFFICE
CERTIFICATE OF CORRECTION

PATENT NO. : 4,292,081

DATED : September 29, 1981

INVENTOR(S) : TADAHIKO WATANABE and SHINICHI KONO

It is certified that error appears in the above—identified patent and that said Letters Patent is hereby corrected as shown below:

On the title page

[30] FOREIGN APPLICATION PRIORITY DATA

Please omit the second priority entry and insert:

--Aug. 2, 1979 [JP] Japan.....54-99220

Aug. 23, 1979[JP] Japan.....54-108451--

Signed and Sealed this

Second Day of March 1982

[SEAL]

Attest:

GERALD J. MOSSINGHOFF

Attesting Officer        Commissioner of Patents and Trademarks